United States Patent [19]

Peschko et al.

[11] Patent Number: 4,755,019
[45] Date of Patent: Jul. 5, 1988

[54] OPTICAL FIBER COUPLING

[75] Inventors: Wolfram Peschko, Dietzenbach, Fed. Rep. of Germany; Hans Schläfli, Buren, Switzerland

[73] Assignee: W. C. Heraeus GmbH, Hanau, Fed. Rep. of Germany

[21] Appl. No.: 83,263

[22] Filed: Aug. 6, 1987

[30] Foreign Application Priority Data

Aug. 16, 1986 [DE] Fed. Rep. of Germany ....... 3627803

[51] Int. Cl.⁴ ................................................ G02B 6/38
[52] U.S. Cl. .................................................. 350/96.21
[58] Field of Search ............................ 350/96.20, 96.21

[56] References Cited

U.S. PATENT DOCUMENTS

| 3,902,785 | 9/1975 | Matthews | 350/96.21 |
|---|---|---|---|
| 3,976,355 | 8/1976 | Matthews | 350/96.21 |
| 4,015,894 | 4/1977 | Rocton | 350/96.21 |
| 4,080,044 | 3/1978 | Gousseau | 350/96.21 |
| 4,090,778 | 5/1978 | Phillips et al. | 350/96.21 |
| 4,105,285 | 8/1978 | Bedgood et al. | 350/96.21 |
| 4,158,477 | 6/1979 | Phillips et al. | 350/96.21 |
| 4,183,619 | 1/1980 | Makuch | 350/96.21 |
| 4,220,398 | 9/1980 | Dalgoutte | 350/96.21 |
| 4,519,672 | 5/1985 | Rogstadius | 350/96.20 |
| 4,632,505 | 12/1986 | Allsworth | 350/96.21 |

Primary Examiner—William L. Sikes
Assistant Examiner—Robert E. Wise
Attorney, Agent, or Firm—Frishauf, Holtz, Goodman & Woodward

[57] ABSTRACT

To permit operation of the light guide under widely varying temperature conditions, for example varying between −50° C. to +70° C., plug elements (5,7), for example of synthetic rubies or sapphires and retained within a hard metal sleeve (4) are formed, essentially throughout their entire cross-sectional area, with facing matching engagement surfaces. The exit or coupling plug element (5) is formed with a polished surface (15) at the side remote from the entrance plug element (7), the polished surface extending at right angles to the axis of a central duct or channel (9) which retains an optical fiber light guide. The exit or coupling plug element (5) is so positioned in the holding sleeve (4) that the polished surface (15) is located at a projecting portion beyond the terminal end (16) of the sleeve, to define a projecting distance (17). Two couplings are connected together by a housing (20). Even under contraction of the plug elements, which due to their higher temperature, coefficient than of the hard metal sleeve contract more, the facing end surfaces will remain in engagement so that no separation will occur due to a possible premature engagement of the holding sleeves of aligned couplings.

19 Claims, 2 Drawing Sheets

OPTICAL FIBER COUPLING

Reference to related patents, the disclosures of which are hereby incorporated by reference:
U.S. Pat. No. 4,015,894, Rocton
U.S. Pat. No. 3,902,785, Matthews
U.S. Pat. No. 3,976,355, Matthews
U.S. Pat. No. 4,090,778, Stanstead et al.
Reference to related publications:
German patent Disclosure Document DE-OS No. 27 22 830, Archer
German patent Disclosure Document DE-OS No. 27 58 964, Kalmbach et al.

The present invention relates to optical fiber technology, and more particularly to a coupling element for optical light guides, typically optical fiber light guides.

Optical fiber light guides require couplings; such couplings usually are made of a synthetic material based on aluminum oxide, for example synthetic sapphires or rubies. The synthetic material is shaped in plug form, drilled with a bore through which the light guide extends. Bores of different plug elements are in alignment, and retained by a coupling structure.

U.S. Pat. No. 4,015,894 describes a coupling for light guide fibers having a plug element and a socket element. Both parts include a jacket sleeve. The end of the jacket sleeves retain a support element, in the form of a synthetic block or plug based on aluminum oxide, such as a ruby or sapphire, each formed with a central bore. The central bore is enlarged at the inlet and outlet side. The light guide is inserted in one of the plug elements up to about half the length of the bore. The matching element retains the light guide in the bore of the plug element, but projecting from the outer surface facing the first element. The coupling units can be fitted together, by one sleeve fitting into an enlarged opening end portion of the other, and the free end or projecting end of the light guide fiber fitting into the bore of the plug element in which the light guide is only partially inserted, so that, when assembled together, the two ends of the light guide fit against and abut each other.

U.S. Pat. No. 3,902,785 describes a coupling for a light guide which is assembled of three elements, which include two plug elements which can be screw-connected by an outer bushing. A group of guide elements in the form of glass bodies with a central through-bore are located in the respective plug and bushing elements. The central bushing element forms a socket to permit guide sleeves to retract into the two outer plug elements and an optical fiber wave guide the to project from the respective glass beads, to be coupled within the glass bead of the central plug element.

U.S. Pat. No. 3,976,355, by the inventor of No. 3,902,785, basically relates to a similar construction in which, however, only two glass elements are used, to be retained within an outer sleeve.

U.S. Pat. No. 4,090,778 describes a plug connection for optical light guides in which two watch jewels, one fitted to each fiber end are aligned. The jewels are mounted on the ends of ferrules and have diameters greater than that of the ferrules, so that alignment of the fibers can be made from the jewels rather than from the ferrules. When fitted together, the watch jewels are abutted against each other.

German patent Disclosure Document DE-OS No. 27 22 830, assigned to the assignee of U.S. Pat. No. 4,090,778, describes an arrangement which again uses a watch jewel fitted in the end of a guide sleeve. A guide duct or channel within the watch jewel is enlarged at its end at a funnel or cup-shape, and the end of the light guide is melted into the funnel-shaped enlargement to form an end portion similar to a rivet head. The rivet head, after having been formed, is then ground flush and polished so that the cone-shaped portion formed by the rivet head in the funnel-shaped enlargement is terminated in a flat surface, flush with the watch jewel.

German patent Disclosure Document DE-OS No. 27 58 964, Kalmbach et al., describes a connecting element for light guides in which the respective ends of light guide fibers are held by watch jewels retained in a sleeve. At the input, the watch jewels are formed with conically enlarged bores in order to facilitate threading of the light guide into the watch jewels. At the axial outer surface, the watch jewels are rounded to form a part-circular or part-spherical surface, so that the watch jewels engage in the holding sleeve only along points or, respectively, a line.

THE INVENTION

It is an object to improve the coupling of optical light guides; and particularly of optical light guide fibers which can be easily handled, permits simple threading or intoduction of the light guide fiber into the coupling element and precise guidance therein, while providing for excellent coupling between two light guides to be connected, which coupling is suitable for placement in environments with widely varying temperatures, for example temperature variations of at least between $-50°$ C. and $+70°$ C. and, desirably, even for wider temperature swings and variations.

Briefly, the coupling element includes a holding sleeve which retains therein an entrance plug element and an exit plug element, both plug elements being, as well known, made of an aluminum oxide base synthetic material, such as a sapphire or ruby; both plug elements are formed with an axial channel or duct in which an optical fiber is retained. In accordance with a feature of the invention, the plug elements are formed with facing end surfaces which are in engagement with each other essentially throughout the entire area, the end surfaces being polished, and projecting from beyond the holding sleeve by a distance which, typically is a short distance, in the order of fractions of a millimeter. When two such coupling elements are abutted against each other, for example by being retained in an outer holding sleeve, or other suitable connecting stucture, the polished facing surfaces of the projecting plugs come into intimate fitting matching engagement. A ring-shaped gap, however, is formed between the holding sleeves, so that the plug surfaces are tightly engaged with each other, independently of the placement of the plug elements within the holding sleeves.

The entrance plug element and the exit plug element, retained with the sleeve, preferably are spaced from each other by intermediate guide plug elements, all of which can be of the same aluminum oxide-based material. The fitting matching surfaces are preferably polished and, in any event, engage throughout the entire area against each other. This substantially facilitates the threading or introduction of a fiber, also in the transition zone between two plug elements. The polished surface at the exit plug element, facing the polished surface of another plug element, extends perpendicularly to the axis of the duct through which the light guide is passed. The end surface, including the ends of the optical light guides being polished flat, provide for tight matching fitting engagement. The holding sleeves for the plug elements, however, will not engage with each other but leave a ring-shaped gap.

Typically, the holding sleeve is made of a hard metal, such as tungsten carbide. The arrangement has the advantage that even extreme variations in temperature will retain the ends of the light guides in engaged position even though the plug elements may expand axially to a greater extent than the holding sleeves. Unless the plug elements project beyond the end surface of the holding sleeve, tight engagement under extreme variations of temperature would not be ensured.

Preferably, the duct through the plug element in which the light guide is threaded, at least in the region where it projects beyond the holding sleeve, has a uniform cross-section, which is so matched in dimension to the fiber light guide, that the fiber light guide is snugly received therein, to provide a fitte seat within the duct. This is particularly desirable for the polishing step, during which the free facing end surface of the exit or coupling plug element, and the light guide fiber retained therein is polished to be flat and perpendicular to the axis of the duct. A snug, tight seat of the end of the light guide ensures a completely flat polished resulting surface.

DRAWING

FIG. 1 is a schematic longitudinal sectional view through a plug connection, in which two connection elements are abutted against each other; and FIG. 2 is an enlarged cross-sectional view through one of the plug elements, reversed 180° with respect to the illustration of FIG. 1.

DETAILED DESCRIPTION

Two light guides 2,2' (FIG. 1) have their end portions held in respective coupling elements 1,1'. An insulating sleeve 3,3' jackets the light guides outside of the coupling element. This insulating sleeve is removed in the end portion of a respective light guide. The coupling elements 1 are connected together by means of a standard coupling connection housing or coupling connection structure, only shown schematically by the broken line 20, since it may be of any suitable and well-known coupling connection, for example including a bayonnet connection, screw connection, or the like, which may be spring-loaded.

Figure 1:
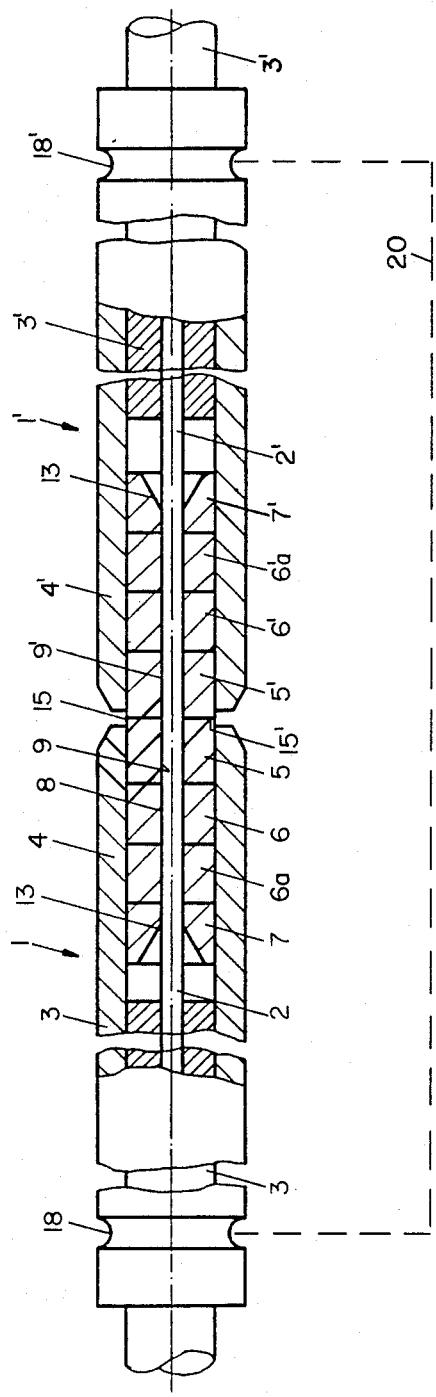

Similar elements of the respective coupling portions have been given the same reference numerals, with the coupling portion at the right side of FIG. 1 with prime notation.

Each one of the coupling portions 1,1' include a sleeve 4,4', preferably of a hard metal, in which four plug elements 5,6,6a and 7; 5',6,5a,7' are retained. The plug element 5 forms the entrance plug element or coupling plug element; plug element 7 forms the exit plug element. Two intermediate plug elements 6,6a are located between elements 5 and 7, all retained in sleeve 4. Ducts 9 are formed in the respective elements 5,6,6a,7, extending in direction of the axis 8 of the sleeve 4. The ducts 9 all are in alignment. The light guide 2 is located in duct 9 and, similarly, light guide 2' is located in duct 9'.

The plug elements are formed of cylindrical segments with facing end surfaces 10 which extend perpendicularly to the axis 8 of the sleeve 4 or of the duct 9, respectively. All four elements 5,6,6a,7 engage throughout the entire facing surfaces 10 against each other, that is, they are abutted and fitting against each other. The entrance element 7 is enlarged in funnel shape at its entrance side 11, in order to provide for easy introduction and threading of the light guide 2 into the duct 9 when the coupling element is assembled. The opening angle 12 (see FIG. 2) of the funnel-shaped enlargement 13 is in the order of about 60°. The length 14 of the funnel-shaped enlargement 13, in axial direction, is about 0.75 mm for a light guide with a customary diameter of about 0.15 down to 0.05 mm.

The exit or coupling element 5 is press-fitted into the sleeve 4 and so seated that its free end surface 15 (FIGS. 1,2) extend slightly beyond the end surfaces 16 of the sleeve 4. In the embodiment shown, the surface 15 extends beyond the end surface 16 of sleeve 4 by about 0.1 mm, a distance schematically indicated at 17 in FIG. 2. This spacing ensures that, when the coupling elements are held together, for example by the holding structure 20, are engaged with their surfaces 15 tightly against each other, whereas the sleeves 4 are spaced from each other by a ring-shaped gap, clearly seen in FIG. 1. The surface engaged end surfaces 15 of the coupling or exit plug elements 5 also ensure that the ends of the light guides 2,2', which are flush with the end surfaces 15,15', also engage each other without gap or spacing.

Figure 2:
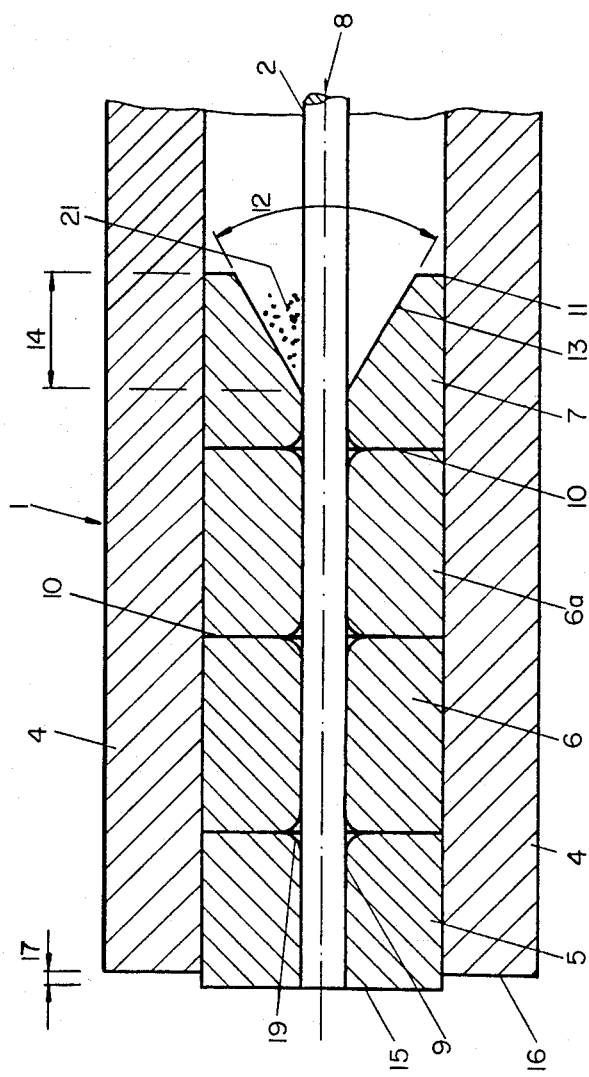

The end regions of the ducts 9 within the plug elements 5,6,6a,7, which are fitting against an adjacent duct 9 of an adjacent plug element, are slightly enlarged, as shown at 19 (FIG. 2). This slight enlargement may be funnel-shaped, or rounded, or can be merely a rounding of the edge of the ducts. This slight enlargement facilitates introduction of the light guide 2 into the duct 9 in the transition region between two plug elements, to provide for free threading and guidance of the light guide 2. To retain the light guide 2 in position, it is secured, for example to the entrance plug element 7, preferably in the region of the funnel-shaped enlargement 13, with a suitable adhesive, schematically shown in fragmentary form in FIG. 2 at 21.

The sleeve 4 has a length which corresponds about to three times the combined guide length of the four plug elements 5,6,6a,7. The end portion of the sleeve 4, not retaining any one of the plug elements, is used to receive the insulating jacket 3 of the light guide 2, and secure the jacket therein. A groove 18, formed at the outer end of the sleeve 4, is used to provide a clamping zone to attach the coupling element 1 to a housing 20, shown only schematically, for example by means of well-known circular clamps or the like.

The projection distance 17 (FIG. 2) may vary, and for example may be between 0.005 mm to 0.5 mm. The preferred range is between 0.01 and 0.2 mm. Especially in the preferred range, a flat surface engagement of the end surfaces 15,15' (FIG. 1) is ensured, even though the operating conditions and temperatures to which the coupling is subjected, may vary within extreme limits.

The enlargement 13 at the inlet end facilitates threading of the light guide 2 into the coupling element 7. Thus, when the coupling parts are assembled, the light guide 2 can be reliably introduced into the bore defined by the duct 9 without damage or difficulty. These bores have only minimum tolerances with respect to the light guide and are tightly matched thereto. Typical light guides have diameters which are between about 0.05 and 0.15 mm, and an enlarged end 14 of about 0.75 is sufficient, which is also sufficient to retain the adhesive 21.

Even a tiny offset of any one of the coupling elements 5,6,6a,7 with respect to each other interferes with ready threading of the light guide 2 in the duct 9. Slightly enlarging the end portions of the ducts, for example merely by rounding the edges of the ducts as shown at 19 (FIG. 2), substantially facilitates threading of the light guide.

In accordance with a preferred feature of the invention, the entrance plug element 7 and the exit, or coupling plug element 5, are separated by intermediate element 6,6a, or more such intermediate plug elements; they are not strictly necessary, however. The use of intermediate plug elements increases the guide length of the light guide 2 from the inlet to the exit surface 15 within the coupling sleeve 4, and thus renders the entire structure more stable. Use of individual intermediate plug elements 6,6a, rather than one longer plug element, has manufacturing advantages. The intermediate plug elements 6,6a, likewise, are preferably formed with rounded corners 19, as clearly seen in FIG. 2.

In accordance with a particularly preferred embodiment, the plug connection includes a sleeve 4 made of a hard metal and plug elements 5,6,6a,7 made of rubies or sapphires. The material characteristics of the ruby/sapphire and hard metal system can be as follows: the hard metal can be in accordance with cutting bits, of the type ISO K10. The composition of such material is 92% W C (tungsten carbide), 2% TiC+TaC; 6% Co.

|  | Sapphire/Ruby | Hard Metal K 10 |
| --- | --- | --- |
| Hardness (Vickers) (HV) | ~2500 HV | 1500 HV bis 1800 HV |
| Modulus of elasticity | $3,6 \times 10^5 N/mm^2$ to $4,4 \times 10^5 N/mm^2$ | $~6,3 \times 10^4 N/mm^2$ |
| Thermal expansion | $6,2 \times 10^{-6}\,°C.^{-1}$ to $5,4 \times 10^{-6}\,°C.^{-1}$ | $~5 \times 10^{-6}\,°C.^{-1}$ |

The data of the table above show that the hard metal is less hard than the sapphire or ruby. This has the advantage that the plug elements can be press-fitted within the hard metal sleeve 4, without wear or distortion of the plug elements, while, however, still retaining the plug elements reliably within the sleeve 4. However, the thermal coefficient of expansion of sapphire or ruby is greater than that of the hard metal K10 referred to in the table. This has the advantage that, as the system is heated, the plug elements 5,6,6a,7, and especially the exit or coupling plug element 5, can expand to a greater extent than the sleeve. This ensures that engaging coupling elements 5,5' (FIG. 1) will tightly engage, even under substantial variations of temperature. Reversely, under low temperatures, contraction of the plug elements will not cause separation of the surfaces since the sleeves 4 are held tightly against each other by the housing 20, yet the sleeves 4 are spaced from each other and cannot impinge against each other and thus cause separation of the surfaces 15,15'. A reliable connection between two light guides, even in the extreme temperature range of between about −50° C. and +70° C., and even more, is ensured.

Various changes and modifications may be made within the scope of the inventive concept.

A suitable adhesive 21 is an epoxy resin.

We claim:

1. Optical fiber coupling having
   a holding sleeve (4,4');
   an entrance plug element (7) located within the sleeve;
   an exit or coupling plug element (5) located within the sleeve, said plug elements including synthetic material comprising aluminum oxide, and being formed with an axial channel or duct (9) located at a central axis (8) of the respective elements within said sleeve (4,4'); and
   an optical fiber element (2,2') located in said channel or duct,
   and wherein, in accordance with the invention
   said plug elements (5,7) are formed with facing end surfaces which are in engagement with each other essentially throughout the entire area, and retained in said sleeve (4) with said entire area engagement;
   said exit or coupling plug element (5) being formed with a polished surface (15) at the side remote from the entrance plug element, which polished surface extends at right angles to the axis (8) of the channel or duct (9); and
   wherein the exit or coupling plug element (5) is positioned in said holding sleeve such that an end portion of the exit plug element formed with said polished surface projects beyond a plane defining the terminal or facing end (16) of said holding sleeve (4) by a predetermined projecting distance (17).

2. The coupling of claim 1, wherein the channel or duct (9) in the exit or coupling plug element (5) at least in the region of said projecting distance (17) has a uniform cross-section, matched to the cross-section of the optical fiber element (2) therein.

3. The coupling of claim 1, wherein said predetermined projecting distance (17) of the polished surface (15) beyond the terminal end of the sleeve (16) is between about 0.005 mm and 0.5 mm.

4. The coupling of claim 3, wherein said projecting distance is between about 0.01 mm and 0.2 mm.

5. The coupling of claim 1, further including an entrance enlargement (13) formed in the entrance plug element at the side remote from the exit or coupling plug element, to enlarge the inlet of the duct (9) of the facilitating threading of the optical fiber element (2).

6. The coupling of claim 5, wherein said enlargement is essentially funnel-shaped and has an axial length of in the order of up to about 0.75 mm.

7. The coupling of claim 5, wherein the enlargement is funnel-shaped with a funnel angle (12) of about 60°.

8. The coupling of claim 1, wherein the channels or ducts (9) are enlarged at the edge portions of the plug elements facing another plug element to facilitate threading of the optical fiber element through said channel or duct (9).

9. The coupling of claim 1, further including at least one intermediate plug element (6,6a) located between the entrance plug element and the exit or coupling plug element (5), said intermediate plug element being formed with facing end surfaces which are in engagement with matching end surfaces of another and adjacent plug element, throughout essentially the entire area thereof.

10. The coupling of claim 9, wherein the channel or duct (9), at least at the side facing the entrance plug element (7) is slightly enlarged at the edge portion of the flat surface facing said entrance plug element.

11. The coupling of claim 1, wherein the plug elements comprise synthetic rubies or sapphires.

12. The coupling of claim 1, wherein the sleeve (4) comprises a hard metal sleeve.

13. Optical fiber structure comprising
two optical fiber couplings
as claimed in claim 1
and a holding connection (20) connecting said fiber couplings together, with said polished surfaces (15,15') of the exit or coupling plug elements (5,5'), and the respective optical fiber elements (2,2') in engagement with each other, said predetermined projecting distance of each of said exit or coupling plug elements defining a gap between the respective holding sleeves (4,4') of said fiber couplings (1,1').

14. The coupling of claim 13, wherein said predetermined projecting distance (17) of the polished surface (15) beyond the terminal end of the sleeve (16) is between about 0.005 mm and 0.5 mm.

15. The coupling of claim 14, wherein said projecting distance is between about 0.01 mm and 0.2 mm.

16. The coupling of claim 13, further including an entrance enlargement (13) formed in the entrance plug element at the side remote from the exit or coupling plug element, to enlarge the inlet of the duct 9 and for facilitating threading of the optical fiber element (2).

17. The coupling of claim 13, further including at least one intermediate plug element (6,6a) located between the entrance plug element and the exit or coupling plug element (5), said intermediate plug element being formed with facing end surfaces which are in engagement with matching end surfaces of another and adjacent plug element, throughout essentially the entire area thereof.

18. The coupling of claim 17, wherein the channel or duct (9,9') of at least one of said plug elements (5,6,6a,7; 5',6',6a',7') at an edge portion facing an adjacent plug element is enlarged with respect to the remainder of the channel or duct.

19. The coupling of claim 13, wherein the plug elements comprise synthetic rubies or sapphires.

* * * * *